United States Patent
McGee et al.

(10) Patent No.: US 6,285,920 B1
(45) Date of Patent: Sep. 4, 2001

(54) METHOD OF ROBOT TEACHING WITH MOTION CONSTRAINTS

(75) Inventors: H. Dean McGee, Rochester Hills; Peter Swanson, Lake Orion; Eric C. Lee, Bloomfield Hills, all of MI (US)

(73) Assignee: Fanuc Robotics North America, Roochester Hills, MI (US)

( * ) Notice: Subject to any disclaimer, the term of this patent is extended or adjusted under 35 U.S.C. 154(b) by 0 days.

(21) Appl. No.: 09/506,816

(22) Filed: Feb. 18, 2000

(51) Int. Cl.$^7$ .................................................. G05B 19/04
(52) U.S. Cl. ..................... 700/254; 700/245; 700/247; 700/253; 700/257; 700/251; 700/259; 700/256; 700/252; 700/260; 700/250; 700/189; 318/568.13; 318/568.14; 318/568.15; 318/568.16; 219/125.11; 219/125.12; 701/2; 701/23
(58) Field of Search ..................................... 700/254, 189, 700/252, 251, 245, 88, 161, 250, 253, 255, 257, 259, 264, 260, 256, 193, 194, 69, 112; 318/568.23, 568.11–568.16, 568.21, 528, 573; 701/2, 23; 219/124.34, 124.33, 86.41, 125.11, 125.12; 90/3, 42, 9; 242/354.2; 436/48

(56) References Cited

U.S. PATENT DOCUMENTS

| | | | |
|---|---|---|---|
| Re. 30,016 | 5/1979 | Hohn | 700/253 |
| 4,011,437 | 3/1977 | Hohn | 318/568.23 |
| 4,260,941 | 4/1981 | Engelberger et al. | 318/568.2 |
| 4,275,986 | 6/1981 | Engelberger et al. | 414/730 |
| 4,283,764 | 8/1981 | Crum et al. | 138/568.14 |
| 4,367,532 | 1/1983 | Crum et al. | 700/260 |
| 4,442,387 | 4/1984 | Lindbom | 318/568.13 |
| 4,447,697 | 5/1984 | Dunne et al. | 219/86.41 |

(List continued on next page.)

OTHER PUBLICATIONS

Raz, Graphics robot simulator for teaching introductory robotics, 1989, Education, IEEE Transactions on Volume: 32 2, May 1989, pp. 153–159.*

Ruoff, Teach—a concurrent robot control language, 1979, IEEE, pp. 442–444.*

Fok et al., An application of computer graphics for teaching robot kinematics, 1994, IEEE, pp. 234–238.*

*Primary Examiner*—William A. Cuchlinski, Jr.
*Assistant Examiner*—McDieunal Marc
(74) *Attorney, Agent, or Firm*—Howard & Howard

(57) ABSTRACT

A method for teaching movements to a robot (12) is disclosed. The robot (12) includes a fixture (14) for cooperating with a workpiece (16), at least one sensor (18) for sensing a spatial relationship of the robot fixture (14) relative to the workpiece (16), at least one motor (20), and a microprocessor (22) for controlling motion of the robot (12) relative to the workpiece (16). The method comprises the steps of storing a predetermined spatial relationship between the robot fixture (14) and the workpiece (16) in the microprocessor (22), imparting movement onto the robot (12), either by an operator physically moving the robot (12) or by actuating a joystick or a teach pendant to step the robot (12) through a desired set of motions, recording the imparted movement on the robot (12) in the microprocessor (22), using the recorded imparted movement to establish initial movement commands, continuously sensing a spatial relationship of the robot fixture (14) relative to the workpiece (16), and comparing the sensed relationship of the robot fixture relative (14) to the workpiece (16) to the predetermined spatial relationship to determine a deviation from the predetermined spatial relationship. The imparted movement of the robot (12) is continuously modified based upon the determined deviation to maintain the spatial relationship of the robot fixture (14) relative to the workpiece (16) during teaching of the robot (12).

11 Claims, 4 Drawing Sheets

U.S. PATENT DOCUMENTS

| | | | |
|---|---|---|---|
| 4,675,502 | | 6/1987 | Haefner et al. ................ 219/124.34 |
| 4,815,845 | * | 3/1989 | Colbaugh et al. .................... 356/153 |
| 4,831,316 | | 5/1989 | Ishiguro et al. ...................... 700/254 |
| 4,870,247 | * | 9/1989 | Fukuoka et al. .................. 219/125.1 |
| 4,907,169 | | 3/1990 | Lovoi ................................... 700/259 |
| 5,075,533 | * | 12/1991 | Fukuoka et al. ................ 219/125.11 |
| 5,171,966 | * | 12/1992 | Fukuoka et al. ................ 219/125.12 |
| 5,341,458 | | 8/1994 | Kaneko et al. ....................... 700/245 |
| 5,357,598 | * | 10/1994 | Ishihara et al. ...................... 700/245 |
| 5,798,627 | | 8/1998 | Gilliland et al. ................ 318/568.14 |
| 5,906,761 | | 5/1999 | Gilliland et al. ................ 219/124.34 |

* cited by examiner

METHOD OF ROBOT TEACHING WITH MOTION CONSTRAINTS

BACKGROUND OF THE INVENTION

1. Field of the Invention

The invention relates to a method of teaching robot movements.

2. Description of the Prior Art

Programmable robots are commonly used for a variety of repetitive industrial applications. As appreciated, a robot only performs tasks and motions that are preprogrammed. Programming of robot motions can be a complicated and time-consuming process. Methods of reducing programming time include programming robot motions by lead through teaching. Typical lead through teaching methods include the steps of moving the robot through a set of desired motions, sensing specific points during the movement of the robot, recording the specific points in a microprocessor, and utilizing the recorded points to create movement commands. The robot repeats the desired motions according to the created movement commands. An operator programming a robot utilizing a lead through teach method is responsible for guiding the robot and for maintaining the desired position and orientation of the robot in three or more dimensions. A drawback to conventional lead through teach methods is that an operator must constantly guide the robot through motions burdened with the requirement to accurately guide the robot through the desired motion while never allowing a collision with an object in the workspace and never allowing the robot to apply excessive pressure to the workpiece. As shown in FIG. 1, the operator polishing a small mold 26 can easily manipulate a hand held polishing tool 28. Referring to FIG. 2, when the same polishing tool 28 is attached to an end of the robot 12, the task becomes burdensome to the operator and intuitive movements by the operator made with the polishing tool 28 become difficult, resulting in less then desirable programmed movements of the robot 12. Additionally, the mold 26 can be damaged if the polishing tool 28 errantly crashes with the mold 26 or applies excessive pressure to the mold 26 due to the operator's inability to overcome the inertial forces of the robot 12 or to otherwise guide the robot 12 along the desired path.

Improvements on this method include the use of various types of teaching handles (not shown) that aid the operator in guiding the robot through the desired motions. Teaching handles improve the operator's mechanical advantage over the robot, however the operator is still left to manipulate and accurately control the robot through the desired motions while maintaining control in three or more dimensions.

Further, some applications require that an end of arm tool be controlled within a tight tolerance relative to the workpiece. Robots are known to utilize a touch sensor that contacts the workpiece during operation. U.S. Pat. No. 5,906,761 to Gilliland et al. utilizes a touch sensor incorporated into a tip of a welding torch. The touch sensor allows the robot to maintain a predetermined distance between the welding tip and the workpiece during welding operations. However, the predetermined distance is maintained during the welding operations not during the teaching of the robot, thereby still leaving the burdensome task to the operator of accurately guiding the robot during teaching.

Consequently, there is a need for a method that allows the operator to teach robot motions while concurrently maintaining a spatial relationship between the robot and the workpiece. Further, it is desirable to free the operator from having to guide the robot in three dimensions during teaching operations in an effort to reduce the complexity of programming desired motions of the robot. Further, simplification of the teaching operation allows for more efficient teaching of robot motions, making additional uses of programmable robots economically feasible.

SUMMARY OF THE INVENTION AND ADVANTAGES

A method of teaching a robot having a robot fixture for cooperating with a workpiece, at least one sensor, and a microprocessor for controlling motion of the robot fixture relative to the workpiece is disclosed. The method comprises the steps of storing a predetermined selected spatial relationship between the robot fixture and the workpiece in the microprocessor, imparting movement onto the robot, recording the imparted movement on the robot in the microprocessor, using the recorded imparted movement to establish initial movement commands, continuously sensing a spatial relationship of the robot fixture relative to the workpiece during movement of the robot, and comparing the sensed spatial relationship of the robot fixture relative to the workpiece to the predetermined selected spatial relationship to determine a deviation from the predetermined selected spatial relationship between the robot fixture and the workpiece. The method is characterized by modifying the imparted movement on the robot based upon the determined deviation from the predetermined selected spatial relationship between the robot fixture and the workpiece to maintain the predetermined selected spatial relationship of the robot fixture relative to the workpiece as the robot moves relative to the workpiece during teaching of the robot.

This method allows an operator to teach robot motions while concurrently maintaining a relationship between the robot fixture and the workpiece. Further, this method frees the operator from guiding the robot in at least one dimension during teaching operations, reducing the complexity of programming desired motions of the robot. Additionally, this method simplifies the teaching operation, allowing quicker teaching of robot motions, making heretofore economically unfeasible uses of programmable robots feasible.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
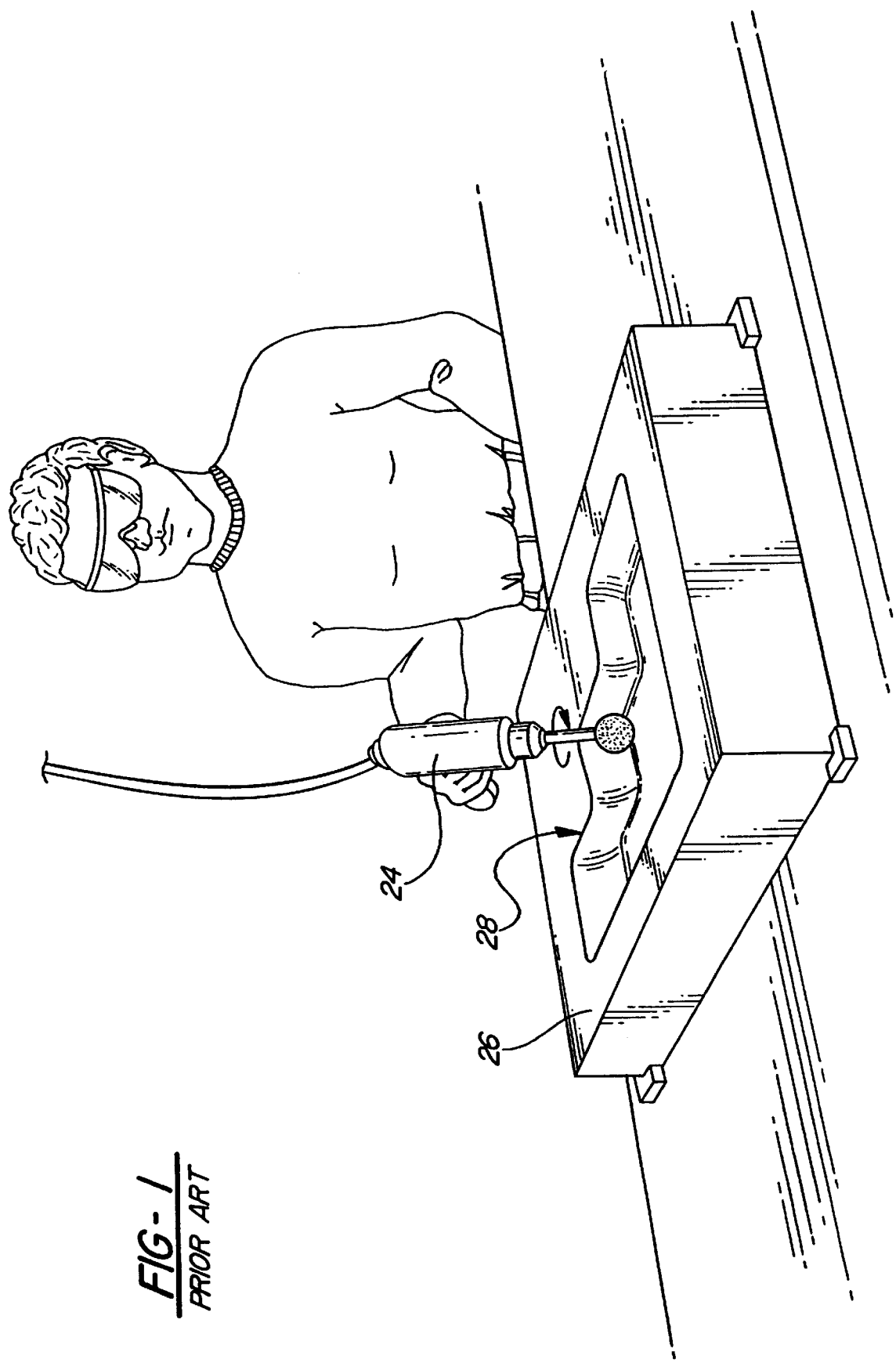
FIG. 1 is a perspective view of an operator utilizing a prior art method for polishing a mold with a hand held polishing tool.

Referring to the Figures, wherein like numerals indicate like or corresponding parts throughout the several views, a method of teaching a robot 12 is disclosed. The robot 12 includes a fixture 14 for cooperating with a workpiece 16, at least one sensor 18, and at least one motor 20 controlled by a microprocessor 22. The fixture 14 for cooperating with the workpiece 16 may comprise any type of tool known in the art. Examples of such tools include a water-jet cutting tip, a laser cutting tip, a welding tip, a polishing wheel 24, etc. Further, it is within the contemplation of this invention that the robot fixture 14 includes any tool or apparatus used to operate with or on the workpiece 16.

Figure 2:
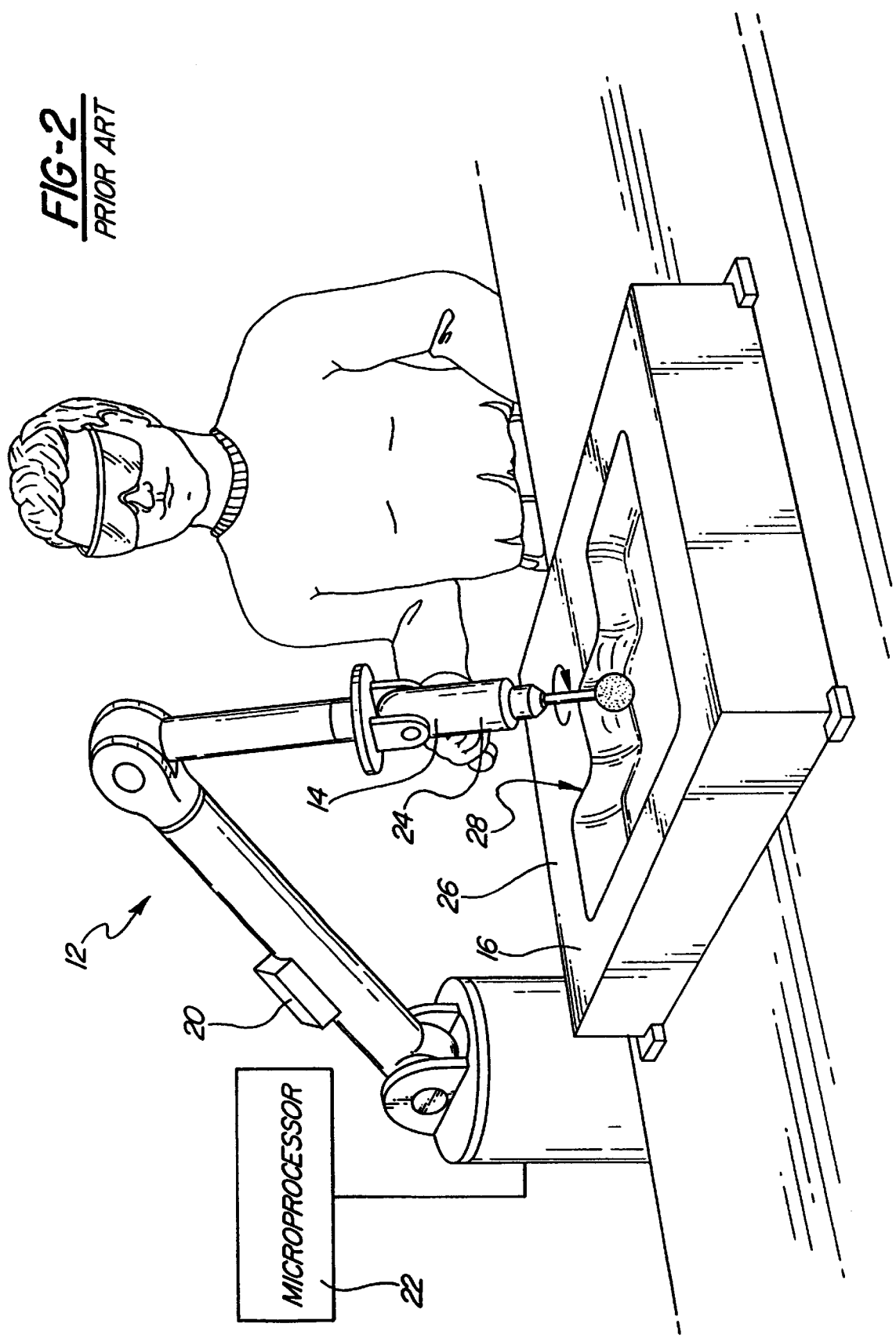
FIG. 2 is a perspective view of an operator utilizing a prior art teaching method to teach robot movements.

The lead through teaching method comprises the steps of storing a predetermined selected spatial relationship between the robot fixture 14 and the workpiece 16, imparting a motion onto the robot 12, recording the imparted movement on the robot 12 in the microprocessor 22, using the recorded imparted movement to establish initial movement commands, continuously sensing a spatial relationship of the robot fixture 14 relative to the workpiece 16, and comparing the sensed spatial relationship of the robot fixture 14 relative to the workpiece 16 to the predetermined selected spatial relationship to determine a deviation from the predetermined selected spatial relationship between the robot fixture 14 and the workpiece 16. Motion imparted onto the robot 12 is accomplished either by an operator physically moving the robot 12, or by the operator utilizing a teach pendant or a joystick to control the motor 20 and progressively step the robot 12 through a desired set of motions. Prior art FIG. 2 illustrates the operator physically guiding the robot 12 where the robot fixture 14 is a polishing wheel 24 to polish a mold 26. The operator grasps the polishing wheel 24 and polishes an internal cavity of the mold 28 as would be done if the process were to be accomplished manually, as shown in prior art FIG. 1. Movements imparted onto the robot 12 are recorded by the microprocessor 22. Movement commands are created utilizing the recorded operator imparted movements.

Physically moving the robot fixture 14 attached to the robot 12 is satisfactory for teaching smaller robots 12 comprising a relatively small, light series of links, and including a small motor 20. However, larger robots 12 comprising large massive links and a correspondingly large motor 20 creates great resistance and difficulties for the operator to control during teaching movements to the robot 12. Accommodations for lead through teaching larger robots 12 include the use of the above mentioned joystick or jog keys to progressively step the robot 12 through the desired motions, or the use of a teach handle (not shown) to allow the operator additional control and leverage in moving the robot 12. An operator utilizing the teach handle, first attaches the handle to the robot fixture 14. Using the teach handle, the operator guides the robot 12 through the desired motions. The motions are recorded and used to create movement commands that the robot 12 will repeat in operation.

Figure 3:
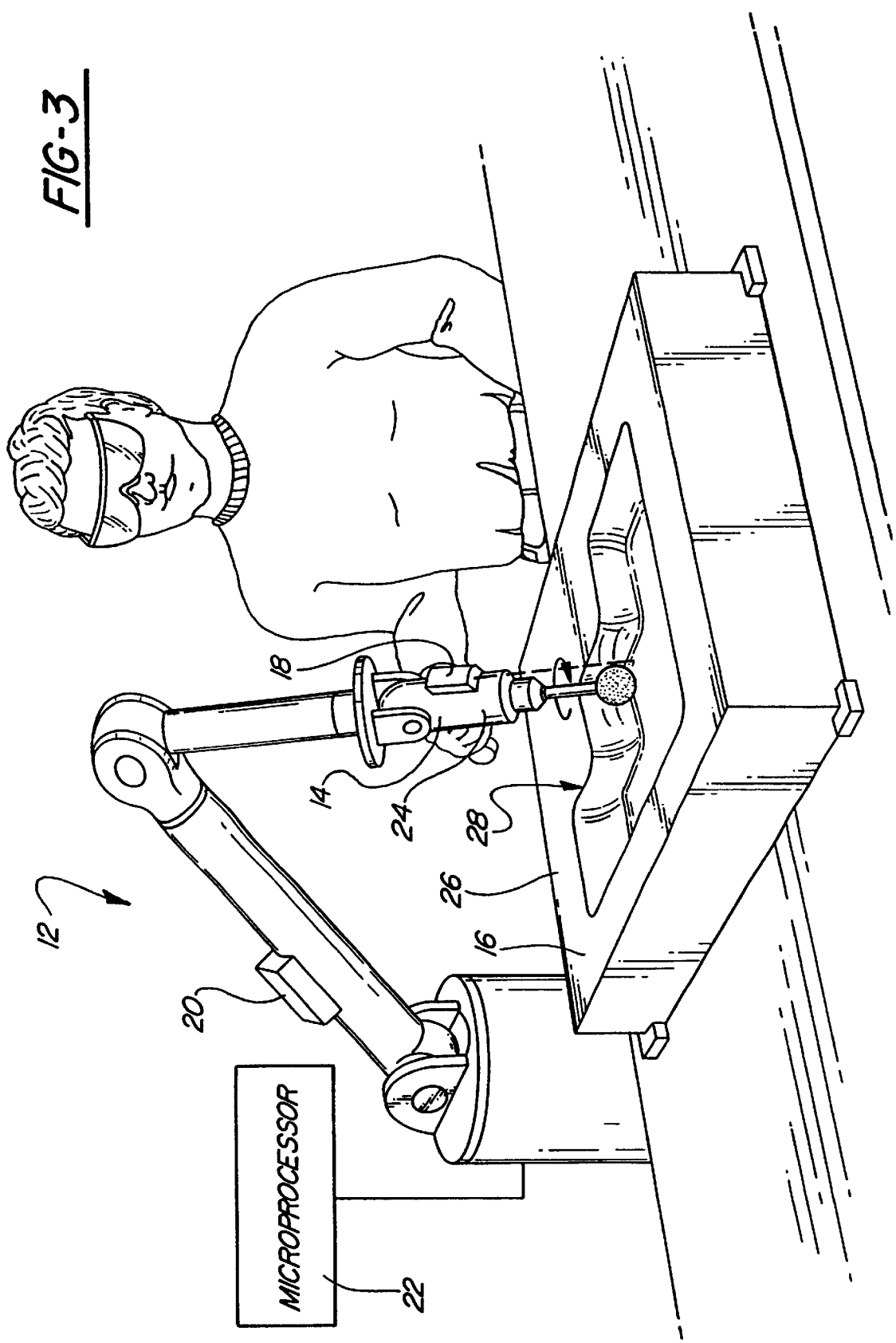
FIG. 3 is a perspective view of an operator teaching robot movements.

Referring now to FIG. 3, the sensor 18 mounted on the robot fixture 14 continuously senses the spatial relationship between the robot fixture 14 and the workpiece 16 as the robot fixture 14 is moved along the workpiece 16 during teaching. The sensor 18 may be of any type known in the art including contact and proximity type sensors. Typically, proximity sensors are utilized when it is desirable to sense the spatial relationship of the robot fixture 14 without contacting the workpiece 16. While continuous type sensors which give an output that is a continuous function of the spatial relationship are preferred, non-continuous type sensors including continuity sensors and other switch type sensors may be used.

Alternatively, sensing the spatial relationship between the robot fixture 14 and the workpiece 16 may be accomplished by sensing a disturbance torque on the motor 20. Disturbance torque is sensed by monitoring torque exerted by the motor 20 as the robot fixture 14 contacts the workpiece 16 and determining the portion of torque due to excessive force exerted on the workpiece 16. Pressure exerted by the robot fixture 14 on the workpiece 16 is maintained within predetermined limits by monitoring motor torque and utilizing the microprocessor 22 to determine the disturbance torque. Further, the spatial relationship between the robot fixture 14 and the workpiece 16 may be sensed utilizing a force sensor (not shown). The force sensor may use the robot fixture, or may use a probe (not shown), that would contact the workpiece 16 and monitor the force exerted against the workpiece 16 by the robot fixture 14. The force exerted by the probe or by the robot fixture 14 against the workpiece 16 is monitored by the microprocessor 22 and movement of the robot 12 is constrained within predetermined limits.

The sensed spatial relationship of the robot fixture 14 relative to the workpiece 16 is compared to the predetermined selected spatial relationship to determine the magnitude of any deviation from the predetermined selected spatial relationship between the robot fixture 14 and the workpiece 16. The magnitude of the deviation from the predetermined selected spatial relationship is the basis for the modification of the imparted movement on the robot 12.

The method is characterized by modifying the imparted movement on the robot 12 based upon the determined deviation from the predetermined selected spatial relationship between the robot fixture 14 and the workpiece 16 to maintain the predetermined selected spatial relationship of the robot fixture 14 relative to the workpiece 16 as the robot 12 moves relative to the workpiece 16 during teaching of the robot 12. Modification of the imparted movement is accomplished by controlling the motor 20 with the microprocessor 22 relative to the stored predetermined selected spatial relationship between the robot fixture 14 and the workpiece 16. The operator's movements are integrated with the predetermined spatial relationship to provide a resultant movement of the robot fixture 14. Integration of the operator movements of the robot fixture 14 with the predetermined selected spatial relationship insures that the robot fixture 14 will maintain the proper predetermined spatial relationship as the robot fixture 14 is moved relative to the workpiece 16 during teaching.

Modifications of imparted movements are based on the sensed relationship between the robot fixture 14 and the workpiece 16. The stored predetermined selected spatial relationship includes the establishment of a tolerance within which the robot fixture 14 may move. Movement of the robot fixture 14 outside of the predetermined selected spatial relationship is prevented by an opposing force exerted by the motor 20, thereby effectively guiding the robot fixture 14 during teaching. Modification of the imparted movements acts to maintain the robot fixture 14 position and orientation relative to the workpiece 16 in at least one dimension, thereby simplifying the task for the operator of teaching movements.

As appreciated by one skilled in the art, the modifications of imparted movements can be generated in a variety of ways. For instance the imparted movement can be separated into two components wherein a first component contains only movement that maintains or seeks to establish the predetermined selected spatial relationship and wherein a second component contains only movement that is counter to establishing or maintaining the predetermined selected spatial relationship. Typically the second component is eliminated or significantly reduced while the first component can be retained without modification or can be changed to affect the resultant magnitude of imparted movement. After the modifications of the two components are complete, they are recombined to achieve a modified imparted movement which is used to establish movement commands that seek to establish or maintain the predetermined selected spatial relationship.

The modifications of imparted movements can apply to a region in the vicinity of the sensed spatial relationship thereby providing a means of accommodating a non-continuous type sensor or the temporary loss of signal from a continuous type sensor and also providing a means for reducing the rate of movement of the robot fixture 14 while the robot fixture is near the workpiece 16. For instance, the movement of the robot fixture 14 can have a relatively high rate until the sensed spatial relationship is within an established tolerance where upon the imparted movements are modified to reduce the rate of the movement of the robot fixture 14. Once initiated, this reduction in the rate of movement of the robot fixture 14 can be effective while the spatial relationship, either a directly sensed spatial relationship or a spatial relationship determined from movement of the robot fixture 14 accumulated following a previous sensed spatial relationship, is within an established tolerance. As appreciated, the tolerances can be different in each of the above stated cases. This can provide the benefit to the operator of automatically reducing the speed of the robot 12 while near the workpiece 16 and automatically restoring the speed when further away from the workpiece 16. This gives the operator better control of the robot fixture 14 while near the workpiece 16.

Referring to FIG. 3, the operator is shown guiding the robot 12 along the inner cavity of a mold 28 to be polished. Without the modification and integration of the predetermined selected spatial relationship into the operator movements, the operator must maintain an even pressure between the polishing wheel 24 and the inner cavity of the mold 28 in addition to coordinating movements along the length and width of the mold 26. Modifying movement of the robot fixture 14 based on the sensed position of the robot relative to the workpiece 16 insures an even pressure between the polishing wheel 24 and the inner cavity of the mold 28. Further, because the operator is relieved from maintaining even pressure between the polishing wheel 24 and the workpiece 16, additional attention may be given to development of an efficient path with which to polish the inner cavity of the mold 28.

Figure 4:
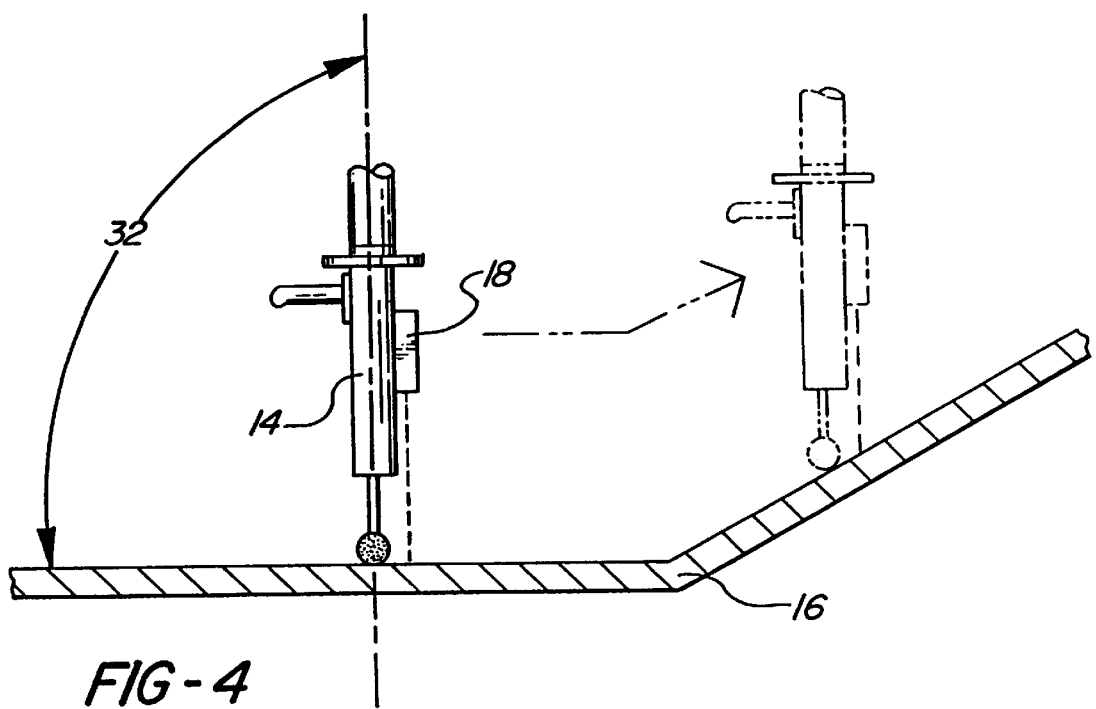
FIG. 4 is a perspective view of the robot fixture tracking the contours of a workpiece.

Referring to FIG. 4, the predetermined selected spatial relationship may include a predetermined distance between the robot fixture 14 and the workpiece 16. Certain applications such as painting, laser cutting and welding and water jet cutting require that a specific distance between the workpiece 16 and the tool be maintained for optimal performance. Further, the required tight tolerances of such applications may make unfeasible lead-through teach methods, due to inherent inaccuracies present with operator guided movement of the robot fixture 14. However, by modifying operator movements within a predetermined tolerance, lead through teaching becomes feasible for such applications. Tolerances may be established that limit imparted motion in only one direction. Such a one sided tolerance is useful to prevent the operator from errantly crashing the robot fixture 14 into the workpiece 16.

Figure 5:
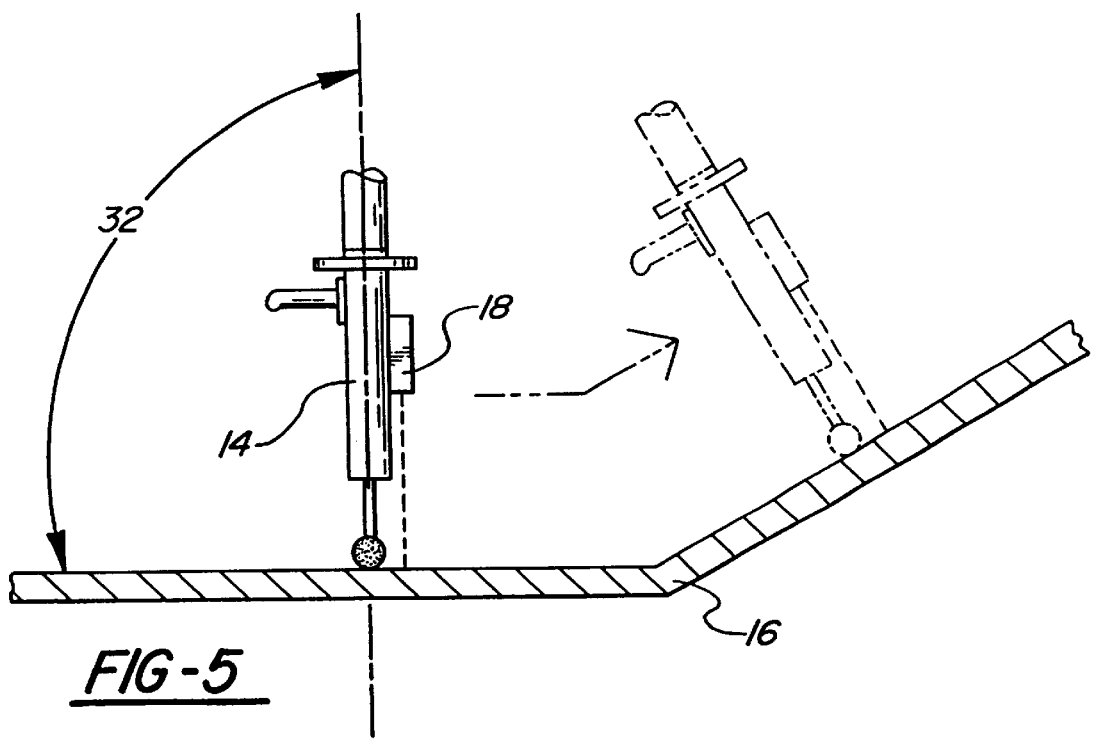
FIG. 5 is a perspective view of the robot fixture tracking the contours of the workpiece while maintaining a specific orientation.

Referring to FIGS. 4 and 5, imparted motion on the robot 12 may also be modified to maintain an angle 32 of the robot fixture 14 relative to the workpiece 16. This angle 32 is commonly referred to as a travel angle 32, and is typically the most difficult to maintain while manually teaching robot movements. Applications such as painting, laser cutting and welding, water jet cutting, arc welding, and polishing require that the travel angle 32 be maintained between the tool and the workpiece 16. Referring to FIG. 4, without maintaining the travel angle 32 the robot fixture 14 will maintain the distance only, and not the travel angle 32 between the robot fixture 14 and the workpiece 16. The travel angle 32 relative to the workpiece 16 may be stored as the predetermined selected spatial orientation so that the imparted movement is modified to maintaining the travel angle 32 relative to the workpiece 16. The robot fixture 14 will then maintain the travel angle 32 to track contours of the workpiece 16. Referring to FIG. 5, the travel angle 32 is typically established to maintain the robot fixture 14 normal to the workpiece 16.

Although the preferred embodiment is described as using a lead through method of teaching, this invention also has significant benefit when used with other forms of teaching such as when using jog keys on a teach pendant or when using a joystick. One problem encountered when using the teach pendant jog keys or the joystick is that motion can only be commanded along specific directions which typically correspond to coordinates of various references frames relative to the robot 12 and the specific directions may not correspond well to maintaining the desired spatial relationship. With this invention, these forms of teaching become much easier because the desired spatial relationship between the robot fixture 14 and the workpiece 16 can be maintained even when the direction of commanded motion is inadvertently counter to the desired motion.

The invention has been described in an illustrative manner, and it is to be understood that the terminology which has been used is intended to be in the nature of words of description rather than of limitation.

Obviously, many modifications and variations of the present invention are possible in light of the above teachings. The invention may be practiced otherwise than as specifically described within the scope of the appended claims, wherein that which is prior art is antecedent to the novelty set forth in the "characterized by" clause. The novelty is meant to be particularly and distinctly recited in the "characterized by" clause whereas the antecedent recitations merely set forth the old and well-known combination in which the invention resides. These antecedent recitations should be interpreted to cover any combination in which the inventive novelty has utility. In addition, the reference numerals are merely for convenience and are not to be in any way to be read as limiting.

What is claimed is:

1. A method of teaching a robot (12) having a robot fixture (14) for cooperating with a workpiece (16), at least one sensor (18), and a microprocessor (22) for controlling motion of the robot fixture (14) relative to the workpiece (16), said method comprising the steps of:

storing a predetermined selected spatial relationship between the robot fixture (14) and the workpiece (16) in the microprocessor (22);

imparting movement onto the robot (12);

recording the imparted movement on the robot (12) in the microprocessor (22) and using the recorded imparted movement to establish initial movement commands;

continuously sensing a spatial relationship of the robot fixture (14) relative to the workpiece (16) during movement of the robot (12);

comparing the sensed spatial relationship of the robot fixture relative (14) to the workpiece (16) to the predetermined selected spatial relationship to determine a deviation from the predetermined selected spatial relationship between the robot fixture (14) and the workpiece (16);

said method characterized by modifying the imparted movement on the robot (12) based upon the determined deviation from the predetermined selected spatial relationship between the robot fixture (14) and the workpiece (16) to maintain the predetermined selected spatial relationship of the robot fixture (14) relative to the workpiece (16) as the robot (12) moves relative to the workpiece (16) during teaching of the robot (12).

2. A method as set forth in claim 1 wherein modifying the imparted movement of the robot (12) is further defined by maintaining a predetermined distance between the robot fixture (14) and the workpiece (16).

3. A method as set forth in claim 1 wherein modifying the imparted movement of the robot (12) is further defined by maintaining an angle (32) of the robot fixture (14) relative to the workpiece (16).

4. A method as set forth in claim 3 wherein maintaining the angle (32) of the robot fixture (14) relative to the workpiece (16) is further defined as maintaining a normal angle (32) of the robot fixture (14) relative to the workpiece (16).

5. A method as set forth in claim 1 wherein the sensing of the spatial relationship between the robot fixture (14) and the workpiece (16) is accomplished by sensing a disturbance torque on the motor (20).

6. A method as set forth in claim 1 wherein the sensing of the spatial relationship between the robot fixture (14) and the workpiece (16) is accomplished by sensing a proximity between the robot fixture (14) and the workpiece (16).

7. A method as set forth in claim 1 wherein the modifying the imparted movement of the robot (12) to maintain the predetermined spatial relationship includes establishing a tolerance within which the robot fixture (14) may move.

8. A method as set forth in claim 1 wherein the modifying of the imparted movement of the robot (12) to maintain the predetermined spatial relationship is further defined by maintaining contact between the robot fixture (14) and the workpiece (16).

9. A method as set forth in claim 1 wherein the modifying of the imparted movement of the robot fixture (14) is accomplished by controlling a motor (20) on the robot (12) with the microprocessor (22).

10. A method as set forth in claim 1 wherein the modifying of the imparted movement of the robot fixture (14) is further defined as limiting movement of the robot fixture (14) in a single direction whereby the robot fixture (14) is prevented from crashing into the workpiece (16).

11. A method as set forth in claim 1 wherein the modifying of the imparted movement of the robot (12) is further defined as reducing the rate of the movement of the robot fixture (14).

\* \* \* \* \*